United States Patent
Ganasan et al.

(10) Patent No.: US 7,249,210 B2
(45) Date of Patent: Jul. 24, 2007

(54) BUS ACCESS ARBITRATION SCHEME (75) Inventors: Jaya Prakash Subramaniam Ganasan, Youngsville, NC (US); Richard Gerard Hofmann, Cary, NC (US); Terence J. Lohman, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 11/070,338

(22) Filed: Mar. 1, 2005

(65) Prior Publication Data

US 2006/0200607 A1 Sep. 7, 2006

(51) Int. Cl.
*G06F 13/36* (2006.01)
*G06F 13/14* (2006.01)
*G06F 13/40* (2006.01)

(52) U.S. Cl. ............... 710/117; 710/118; 710/241
(58) Field of Classification Search ............ 710/111, 710/116–118, 120
See application file for complete search history.

(56) References Cited

U.S. PATENT DOCUMENTS

| | | | |
|---|---|---|---|
| 5,784,569 A | 7/1998 | Miller et al. | |
| 6,088,751 A * | 7/2000 | Jaramillo | 710/116 |
| 6,092,137 A * | 7/2000 | Huang et al. | 710/111 |
| 6,138,200 A * | 10/2000 | Ogilvie | 710/244 |
| 6,157,978 A * | 12/2000 | Ng et al. | 710/240 |
| 6,205,524 B1 * | 3/2001 | Ng | 711/151 |
| 6,385,678 B2 * | 5/2002 | Jacobs et al. | 710/113 |
| 6,393,508 B2 * | 5/2002 | Rekeita et al. | 710/243 |
| 6,473,817 B1 * | 10/2002 | Jeddeloh | 710/113 |
| 6,516,369 B1 * | 2/2003 | Bredin | 710/111 |
| 6,654,833 B1 * | 11/2003 | LaBerge | 710/107 |
| 6,910,088 B2 * | 6/2005 | LaBerge | 710/117 |
| 7,065,595 B2 * | 6/2006 | Drerup et al. | 710/117 |
| 2001/0027505 A1 * | 10/2001 | Rekeita et al. | 710/243 |
| 2001/0056515 A1 * | 12/2001 | Jacobs et al. | 710/240 |
| 2003/0074507 A1 | 4/2003 | Weber | |
| 2003/0229742 A1 * | 12/2003 | Moss | 710/111 |
| 2005/0204085 A1 * | 9/2005 | Fukuyama et al. | 710/244 |

OTHER PUBLICATIONS

A Simple and Efficient Bus Management Scheme that Supports Continuous Streams, Saied Hosseini-Khayat and Andreas D. Bovopoulos, May 13, 1995, ACM Transactions on Computer Systems, vol. 13, No. 2, pp. 122-140.

* cited by examiner

*Primary Examiner*—Paul R. Myers
*Assistant Examiner*—Ryan M Stiglic
(74) *Attorney, Agent, or Firm*—Nicholas J. Pawley; Thomas Rouse; Joseph B. Agusta (57) ABSTRACT

A bus arbitration scheme in a processing system. The processing system includes a bus, a plurality of processors coupled to the bus, and a bus arbiter. The bus arbiter may assign a first tier weight to each of the processors in a first tier, and a second tier weight to each of the processors in a second tier. The bus arbiter may sequentially grant bus access to the one or more processors during an initial portion of a bus interval based on the assigned second tier weights, and grant bus access to any one of the processors during the initial portion of the bus interval in response to a request from said any one of the processors having a first tier weight. When multiple processors are requesting access to the bus, the bus arbiter may grant bus access to the requesting processor with the highest weight in the highest tier.

34 Claims, 5 Drawing Sheets

| PROCESSOR | TOKENS ASSG. | P₁ 301 | P₁ P₂ 302 303 | P₁ P₂ 304 | P₃ P₂ P₁ 305 306 307 | P₄ 308 | P₅ 309 | P₆ 310 | P₁ 311 | P₂ 312 | P₃ 313 |
|---|---|---|---|---|---|---|---|---|---|---|---|
| | | ←———— 204 ————→ | | | | ←———— 206 ————→ | | | | | |
| $P_1$ | 4 | 3 | 2 2 | 2 1 | 1 1 0 | 0 | 0 | 0 | 0 | 0 | 0 |
| $P_2$ | 2 | 2 | 2 1 | 1 1 | 1 0 0 | 0 | 0 | 0 | 0 | 0 | 0 |
| $P_3$ | 1 | 1 | 1 1 | 1 1 | 0 0 0 | 0 | 0 | 0 | 0 | 0 | 0 |
| $P_4$ | 0 | 0 | 0 0 | 0 0 | 0 0 0 | 0 | 0 | 0 | 0 | 0 | 0 |
| $P_5$ | 0 | 0 | 0 0 | 0 0 | 0 0 0 | 0 | 0 | 0 | 0 | 0 | 0 |
| $P_6$ | 0 | 0 | 0 0 | 0 0 | 0 0 0 | 0 | 0 | 0 | 0 | 0 | 0 |

TOKENS REMAINING

| PROCESSOR | TOKENS ASSG. | | | | | | | | | | | | | | |
|---|---|---|---|---|---|---|---|---|---|---|---|---|---|---|---|
| | | P₃ | P₂ | P₁ | P₂ | P₃ | P₂ | P₄ | P₃ | P₂ | P₅ | P₆ | P₁ | P₂ | P₇ | P₁ |
| | | 501 | 502 | 503 | 504 | 505 | 506 | 507 | 508 | 509 | 510 | 511 | 512 | 513 | 514 | 515 |
| P₁ TIER 1 | 2 | 2 | 2 | 1 | 1 | 1 | 2 | 2 | 2 | 2 | 2 | 2 | 1 | 1 | 1 | 1 |
| P₂ TIER 1 TIER 2 | 1 2 | 1 2 | 1 1 | 1 1 | 0 1 | 1 1 | 0 1 | 0 1 | 0 0 | 0 0 | 0 0 | 1 0 | 1 0 | 0 0 | 0 0 | 0 0 |
| P₃ TIER 2 | 3 | 2 | 2 | 2 | 2 | 1 | 1 | 1 | 1 | 0 | 0 | 0 | 0 | 0 | 0 | 0 |
| P₄ TIER 2 | 1 | 1 | 1 | 1 | 1 | 1 | 1 | 0 | 0 | 0 | 0 | 0 | 0 | 0 | 0 | 0 |
| P₅ | 0 | 0 | 0 | 0 | 0 | 0 | 0 | 0 | 0 | 0 | 0 | 0 | 0 | 0 | 0 | 0 |
| P₆ | 0 | 0 | 0 | 0 | 0 | 0 | 0 | 0 | 0 | 0 | 0 | 0 | 0 | 0 | 0 | 0 |
| P₇ | 0 | 0 | 0 | 0 | 0 | 0 | 0 | 0 | 0 | 0 | 0 | 0 | 0 | 0 | 0 | 0 |
| TIER 1 REQUESTS | | | P₁/P₂ | P₁/P₂ | | | P₂ | | | | | | P₁/P₂ | P₁/P₂ | | |

TOKENS REMAINING

BUS ACCESS ARBITRATION SCHEME

BACKGROUND

1. Field

The present disclosure relates generally to processing systems, and more specifically, to a bus access arbitration scheme in a processing system.

2. Background

Computers have revolutionized the electronics industry by enabling sophisticated processing tasks to be performed with just a few strokes of a keypad. These sophisticated tasks involve an incredibly high number of complex components that communicate with one another in a fast and efficient manner using a bus. A bus is a channel or path between components in a computer or other computational device.

Many buses have been traditionally implemented as shared buses. A shared bus provides a means for any number of components to communicate over a common path or channel. In recent years, shared bus technology has been replaced to a large extent by point-to-point switching connections. Point-to-point switching connections provide a direct connection between two components on the bus while they are communicating with each other. Multiple direct links may be used to allow several components to communicate at the same time. A bus arbiter may be used to manage communications over the bus.

A computer implementing a bus architecture may include any number of processing components connected to one or more shared resources, such as memory. One or more processors (bus master) may initiate a bus transaction by requesting access from the bus arbiter. The bus arbiter determines the sequence in which the processors will be granted access to the bus based on a pre-determined algorithm. Various bus access arbitration schemes have been implemented in the past to manage these transactions. A fairly common approach is a round robin arbitration scheme which allocates bandwidth evenly across all processing components, but has no notion of latency requirements. Another common approach is a fixed priority arbitration scheme which has some notion of latency requirements, but severely degrades low priority processors which may require high bandwidth. Time-division-multiplexing is probably a better solution than a round robin or fixed priority based arbitration scheme, but it is difficult to predict when a particular processor may require access to the bus. Accordingly, there is a need in the art for a bus access arbitration scheme that provides the ability to allocate bandwidth allocation while still maintaining latency requirements for the processors on the bus.

SUMMARY

In one aspect of the present invention, a processing system includes a bus, a plurality of processors coupled to the bus, and a bus arbiter configured to assign a second tier weight to each of one or more of the processors, and sequentially grant bus access to the one or more processors during an initial portion of a bus interval based on the assigned second tier weights. The bus arbiter is further configured to grant bus access to any one of the processors during the initial portion of the bus interval in response to a request from said any one of the processors having a first tier weight.

In another aspect of the present invention, a processing system includes a bus, a plurality of processors coupled to the bus, and a bus arbiter configured to assign a first tier weight to each of the processors in a first tier, and assign a second tier weight to each of the processors in a second tier. The bus arbiter is further configured to arbitrate between one or more of the processors requesting access to the bus by granting bus access to the requesting processor with the highest weight in the highest tier, the first tier being higher than the second tier.

In a further aspect of the present invention, a method of arbitrating between a plurality of processors requesting access to a bus includes assigning a second tier weight to each of one or more of the processors, sequentially granting bus access to the one or more processors during an initial portion of a bus interval based on the assigned second tier weights, and granting bus access to any one of the processors during the initial portion of the bus interval in response to a request from said any one of the processors having a first tier weight.

In yet a further aspect of the present invention, a method of arbitrating between a plurality of processors requesting access to a bus includes assigning a first tier weight to each of the processors in a first tier; assigning a second tier weight to each of the processors in a second tier, and arbitrating between one or more of the processors requesting access to the bus by granting bus access to the requesting processor with the highest weight in the highest tier, the first tier being higher than the second tier.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
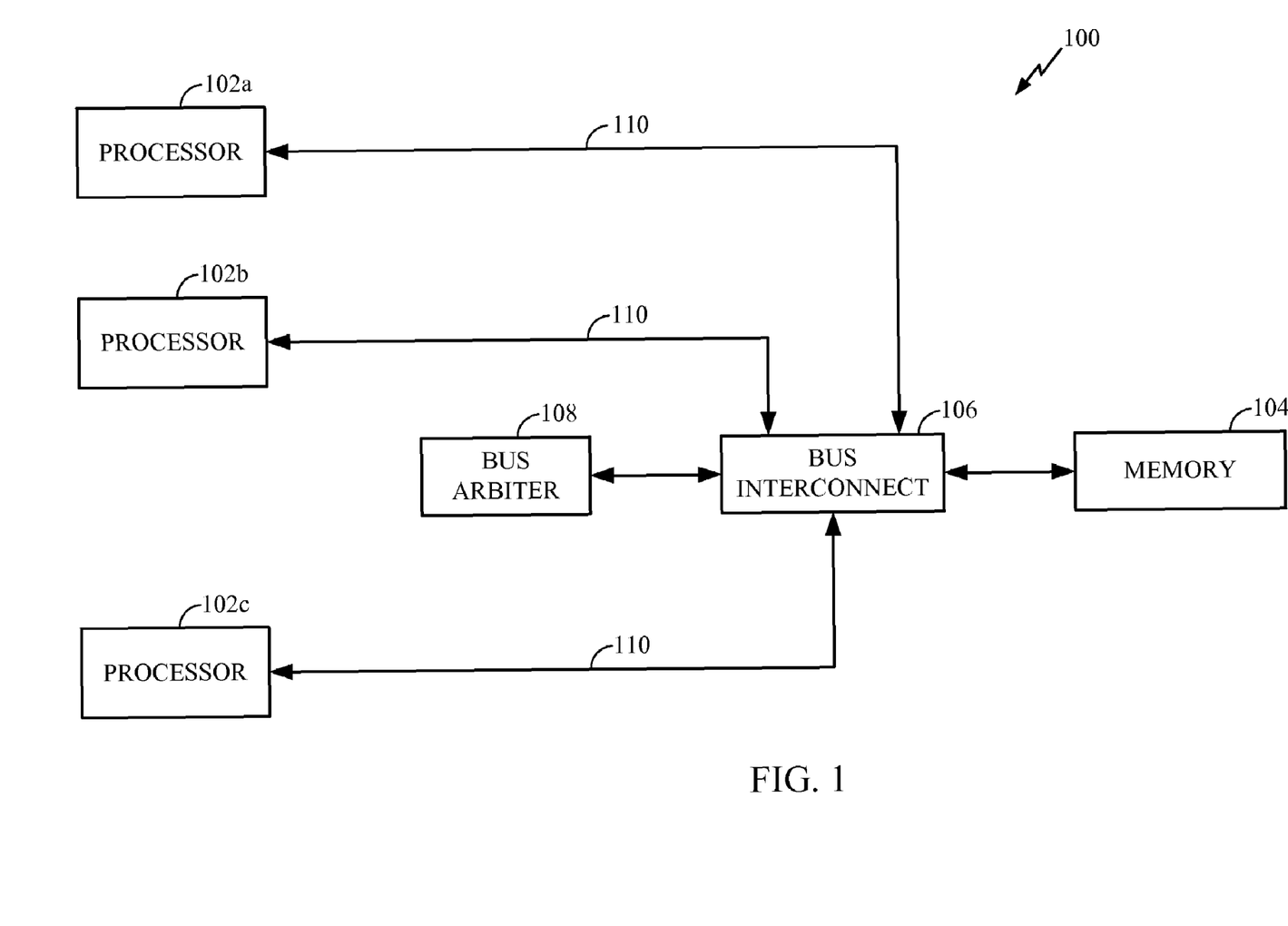
FIG. 1 is a conceptual block diagram illustrating an example of a processing system.

FIG. 1 is a conceptual block diagram illustrating an example of a processing system. The processing system 100 may be a computer, or resident in a computer, or any other system capable of processing, retrieving and storing information. The processing system 100 may be a stand-alone system, or alternatively, embedded in a device, such as a wireless telephone, a personal digital assistant (PDA), a personal computer (PC), a laptop, or the like.

The processing system 100 is shown with several processors 102a-102c that may access memory 104 over a bus 110, but may be configured with any number of processors depending on the particular application and the overall design constraints. Each processor may be implemented as any type of bus mastering component including, by way of example, a microprocessor, a digital signal processor (DSP), a video graphics processor, a modem processor, or any other information processing component. The memory 104 may be a memory controller, cache, stacked memory, or any other component capable of retrieving and storing information.

A bus arbiter 108 may be used to grant bus access to the processors 102a-102c. The bus 110 may be implemented with point-to-point switching connections through a bus interconnect 106. In this configuration, the bus arbiter 108 configures the bus interconnect 112 to provide a direct connection between one of the processors and the memory 104. Multiple direct links within the bus interconnect 106 may be used to allow the other processors to communicate with other bus slave devices at the same time. Alternatively, the bus 110 may be implemented as a shared bus, or any other type of bus, under control of the bus arbiter 108.

The bus arbiter 108 may be used to manage access to the bus 110 by the processors 102a-102c. In one embodiment of the bus arbiter 108, the processing components 102a-102c may broadcast commands, along with the associated program instructions and/or data, to the bus arbiter 108. The bus arbiter 108 may determine the sequence in which the commands, and associated program instructions and data, will be provided to the memory 104 and dynamically configure the bus interconnect 106 accordingly. In another embodiment of the bus arbiter 108, the processors 102a-102c may request access to the bus 110, and the bus arbiter 108 may determine the sequence in which the requests will be granted, again, by dynamically reconfiguring the interconnect 106. In either case, the bus arbiter 108 determines the sequence in which the commands, and associated program instructions and data, are provided to the memory 104 based on a bus access arbitration scheme.

The bus access arbitration scheme may be implemented to accommodate the functional requirements of the various processors 102a-102c. By way of example, a processor may require high bandwidth, such as a video graphics processor. Another processor may require low latency communications, such as a DSP processing voice communications. Still another processor may not have any bandwidth or latency requirements, such as a central processing unit (CPU) processing Internet e-mail. The latter communications (those without any bandwidth or latency requirements) are often referred to as "best efforts" communications.

The bus access arbitration scheme may be used to allocate bandwidth among the various processors while maintaining latency requirements. This may be achieved by creating multiple tiers from which access to the bus 110 will be determined. By way of example, a first tier may be used to schedule low latency requests, a second tier may be used to schedule high bandwidth requests, and a third tier may be used for non-critical applications in terms of latency and bandwidth. A programmable or tunable weight may be assigned to each processor in the first two tiers. The assigned weight may be thought of as a number of "tokens" that can be spent to access the bus 110. The assigned weight for each processor may be reset periodically based on a time period. The period may be the same or different for the first two tiers.

A bus access arbitration scheme for the second tier will first be discussed. The second tier may be used to ensure that each processor 102 receives the bandwidth it requires. This may be achieved by assigning each processor 102 a weight commensurate with its bandwidth requirements. The weight may be used to ensure that the processor 102 receives a minimum number of bus access grants during a given time period. Alternatively, the weight may be used to allocate data beats or bytes to a processor 102. The weight may be programmable or tunable to accommodate changing bandwidth requirements. By way of example, a processor 102 may launch a new application that requires more or less bandwidth. The bus arbiter 108 may respond by changing the weight assigned to that processor 102 accordingly.

The weights may be assigned to the various processors 102 by the bus arbiter 108 when the processing system 100 initially powers up. During power up, each processor 102 connected to the bus 110, and having a bandwidth requirement, communicates its requirement to the bus arbiter 108. Based on those communications, the bus arbiter 108 allocates a portion of the bandwidth to each. The remaining bandwidth may be used for best efforts communications. During operation, if a processor 102 launches a new application, or its bandwidth requirements otherwise change, a new weight may be negotiated between that processor 102 and the bus arbiter 108.

Figure 2:
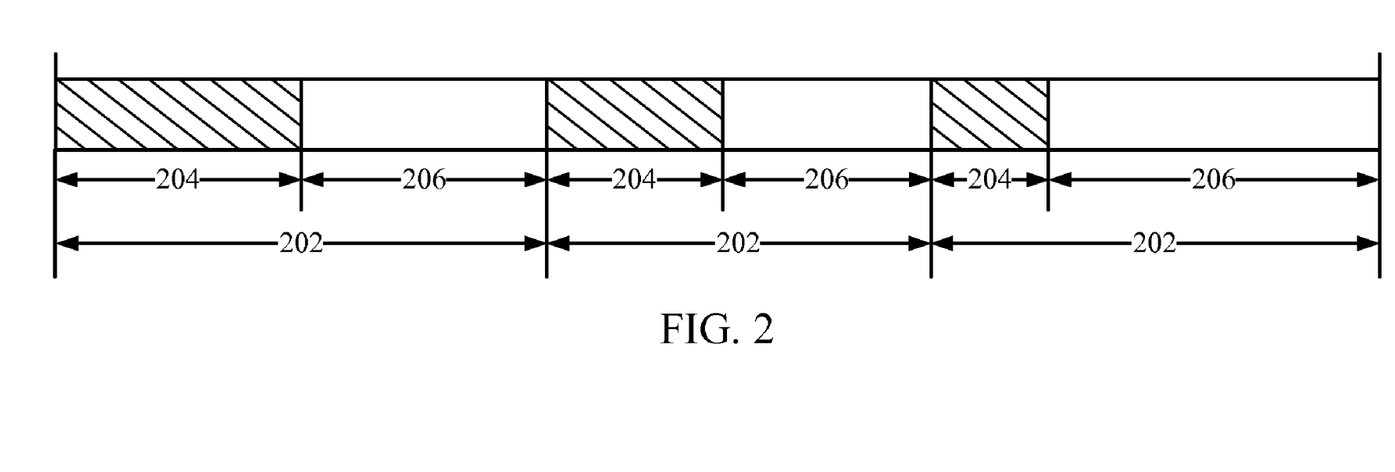
FIG. 2 is a conceptual diagram illustrating the timing of a bus access arbitration scheme capable of supporting high bandwidth requirements for various processors.

FIG. 2 is a conceptual diagram illustrating the timing of a bus access arbitration scheme for the second tier processors. The bus arbiter determines a bus interval 202 based on the bandwidth requirements of the various processors and the need to support best efforts communications. The bus interval 202 may be programmable or tunable to support changing bandwidth requirements. In at least one embodiment of the bus arbiter, the bus interval 202 may be divided into two time periods: a weighted time period 204 and a best efforts time period 206. During the weighted time period 204, contention for the bus may be resolved by granting bus access to the processor with the highest weight. Third tier processors may be granted access to the bus during the weighted time period 204 when second tier processors are not requesting access. The weight of each second tier processor may be reduced every time it is granted access to the bus. The weighted time period 204 continues until the weight assigned to each of the second tier processors is reduced to zero. The best efforts time period 206 follows the weighted period 204 and continues until the end of the bus interval 202. During the best efforts time period 206, contention for the bus may be resolved in a round robin fashion.

Figure 3:
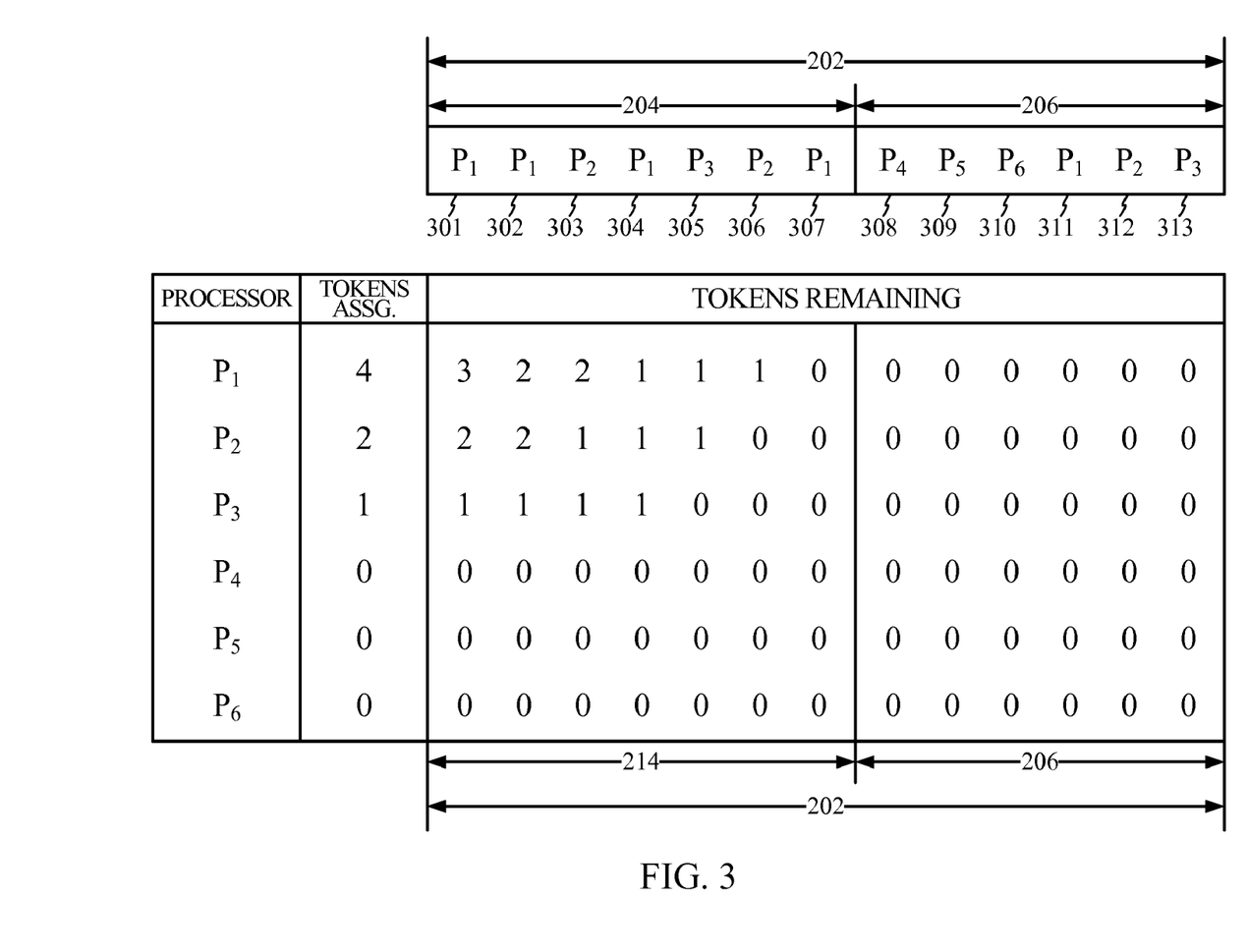
FIG. 3 is a conceptual diagram illustrating the operation of a bus access arbitration scheme capable of supporting high bandwidth requirements for various processors.

FIG. 3 is a conceptual diagram illustrating the operation of a bus arbitration scheme for the second tier processors. In this example, there are three second tier processors ($P_1$, $P_2$, and $P_3$) and three third tier processors ($P_4$, $P_5$, and $P_6$). The weights assigned by the bus arbiter to the second tier processors will be referred to as tokens. The first processor $P_1$ requires the most bandwidth and is assigned four tokens by the bus arbiter. The second and third processors $P_2$ and $P_3$ are lower bandwidth processors, and assigned two and one tokens, respectively, by the bus arbiter. The following example assumes that all the processors are continually requesting access to the bus.

Referring to FIG. 3, the bus access arbitration scheme enters the weighted time period 204 at the beginning of the bus interval 202. Contention for the bus during the first time slot 301 is resolved by granting access to the processor with the most tokens, which in this case is the first processor $P_1$ with four tokens. Upon granting bus access to the first processor $P_1$ the bus arbiter reduces the first processor's tokens by one, leaving it with three tokens. The three remaining tokens for the first processor $P_1$ is sufficient to gain access to the bus during the second time slot 302. The bus arbiter takes another token from the first processor $P_1$ after granting it access to the bus, leaving it with two tokens.

Contention for the bus during the third time slot 303 is also resolved by granting access to the processor with the most tokens. However, in this case, both the first and the second processors $P_1$ and $P_2$ have two tokens, which is more than any of the other processors. The bus arbiter may employ a round robin arbitration scheme to arbitrate between the two processors. Since the first processor $P_1$ was granted access to the bus in the previous time slot 302, the bus arbiter grants access to the second processor $P_2$ during the current time slot 303. Upon granting bus access to the second processor $P_2$, the bus arbiter reduces the second processor's tokens by one, leaving it with only one token. The first processor $P_1$, with two tokens remaining, is granted access to the bus by the bus arbiter during the fourth time slot 304, and exhausts another token in the process.

During the fifth time slot 305, each of the second tier processors $P_1$, $P_2$, $P_3$ has one token. The bus arbiter may use a round robin arbitration scheme to arbitrate access to the bus. In this case, both the first and second processors $P_1$ and $P_2$ have accessed the bus during the current bus interval 202. The third processor $P_3$, which has yet to access the bus in the current bus interval 202, may be granted access. Upon granting bus access to the third processor $P_3$, the bus arbiter reduces the third processor's tokens to zero, leaving the first and second processors $P_1$ and $P_2$ with the most tokens in the sixth time slot 306. The bus arbiter may continue to use a round robin arbitration scheme to grant memory access to the first and second processors $P_1$ and $P_2$ in the following two time slots 306 and 307 in any order, thereby exhausting all tokens for the second tier processors to close out the weighted time period 204 of the bus interval 202.

The best efforts time slot 206 follows the weighted time slot 204. During the best efforts time slot 206, the bus arbiter may grant access to the bus in a round robin fashion. In the example shown in FIG. 3, there are six time slots 308-313 in the best efforts time slot 206. There are also six processors: three second tier processors $P_1$, $P_2$, $P_3$ with their tokens depleted, and three third tier processors $P_4$, $P_5$, $P_6$. Accordingly, under any round robin arbitration scheme, each processor should be granted access to the bus once. The order is not necessarily important, but the three third tier processors $P_4$ $P_5$ $P_6$ should probably be granted access to the bus first to ensure access if the best efforts time slot 206 is relatively short. In the example shown in FIG. 3, the fourth processor $P_4$ is granted access to the bus during the eighth time slot 308, the fifth processor $P_5$ is granted access to the bus in the ninth time slot 309, the sixth processor $P_6$ is granted access to the bus in the tenth time slot 310, the first processor $P_1$ is granted access to the bus in the eleventh time slot 311, the second processor $P_2$ is granted access to the bus in the twelfth time slot 312, and the third processor $P_3$ is granted access to the bus in the thirteenth time slot 313.

A first tier bus access arbitration scheme may be implemented as an overlay to the second tier bus access arbitration scheme to accommodate processors with low latency requirements. Returning to FIG. 1, a processor 102 requiring low latency access to the memory 104 may be assigned to a first tier by the bus arbiter 108. If the same processor 102 has high bandwidth requirements, it may also receive a second tier assignment as well. In a manner similar to that described in connection with the second tier bus access arbitration scheme, a programmable or tunable weight may be assigned to each processor 102 in the first tier by the bus arbiter 108. The weight assigned to a processor may be used to ensure that it receives a minimum number of bus access grants during a given time period. The point in time or mechanism in which a processors request becomes a first tier request may be accomplished by the processor indicating that the request is a first tier request via an additional signal to the arbiter or by the arbiter itself elevating the processor's request to become a first tier request. For example, the arbiter could have a latency timer which counts the clock cycles in which a master's request has been pending and has not been granted. Once the latency timer has reached or exceeded a programmable value, the arbiter can internally elevate the processor's request to become a first tier. Alternatively, the weight may be used to allocate data beats or bytes to a processor during the time period. The time period may be the same or different from the bus interval. The weight may be programmable or tunable to accommodate changing latency requirements.

When the processing system 100 initially powers up, each processor 102 connected to the bus 110, and having a latency requirement, communicates its requirements to the bus arbiter 108. In some instances, a processor 102 may communicate both latency and bandwidth requirements to the bus arbiter 108. In response to those communications, the bus arbiter makes the appropriate first and second tier assignments to the various processors 102 connected to the bus 110. The bus arbiter 108 also assigns a weight to each first and second tier processor 102. During operation, if a processor 102 launches a new application, or its latency requirements otherwise change, a new weight may be negotiated between that processor 102 and the bus arbiter 108 for one or more tiers.

Figure 4:
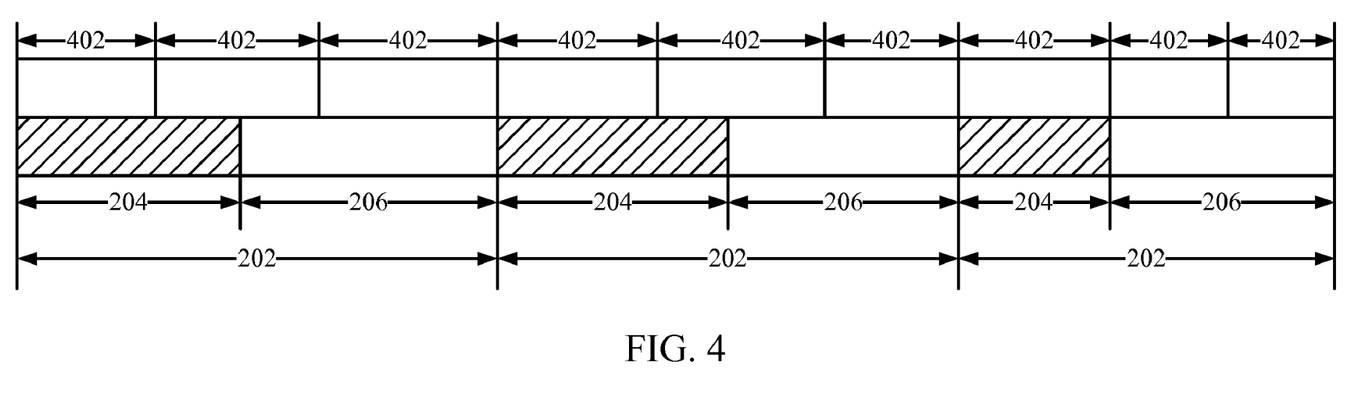
FIG. 4 is a conceptual diagram illustrating the timing of a bus access arbitration scheme capable of supporting both latency and high bandwidth requirements for various processors.

FIG. 4 is a conceptual diagram illustrating the timing of a first tier bus access arbitration scheme overlayed on the second tier bus access arbitration scheme of FIG. 2. In this example, the bus arbiter determines a quality of service interval 402 based on the latency requirements of the various first tier processors. The quality of service interval 402 may be programmable or tunable to support changing latency requirements. During the quality of service interval 402, a first tier processor requesting access to the bus may be given priority over second and third tier requests. Contention for the bus between two or more first tier processors may be resolved by granting access to the processor with the highest weight. The weight of each processor is reduced every time it is granted access to the bus. When the weight of a first tier processor reaches zero, no further first tier bus access requests will be granted by the bus arbiter during the current quality of service interval 402. The weight for each first tier processor will be reset to its original assigned value by the bus arbiter at the beginning of each quality of service interval 402. The quality of service interval 402 may be the same as the bus interval 202, or may be different. If the two intervals are different, the bus interval 202 may be longer or shorter than the quality of service interval 202, and the two time periods may or may not be multiples of one another. In the example shown in FIG. 4, the bus interval 202 is three times longer than the quality of service interval 402.

Figure 5:
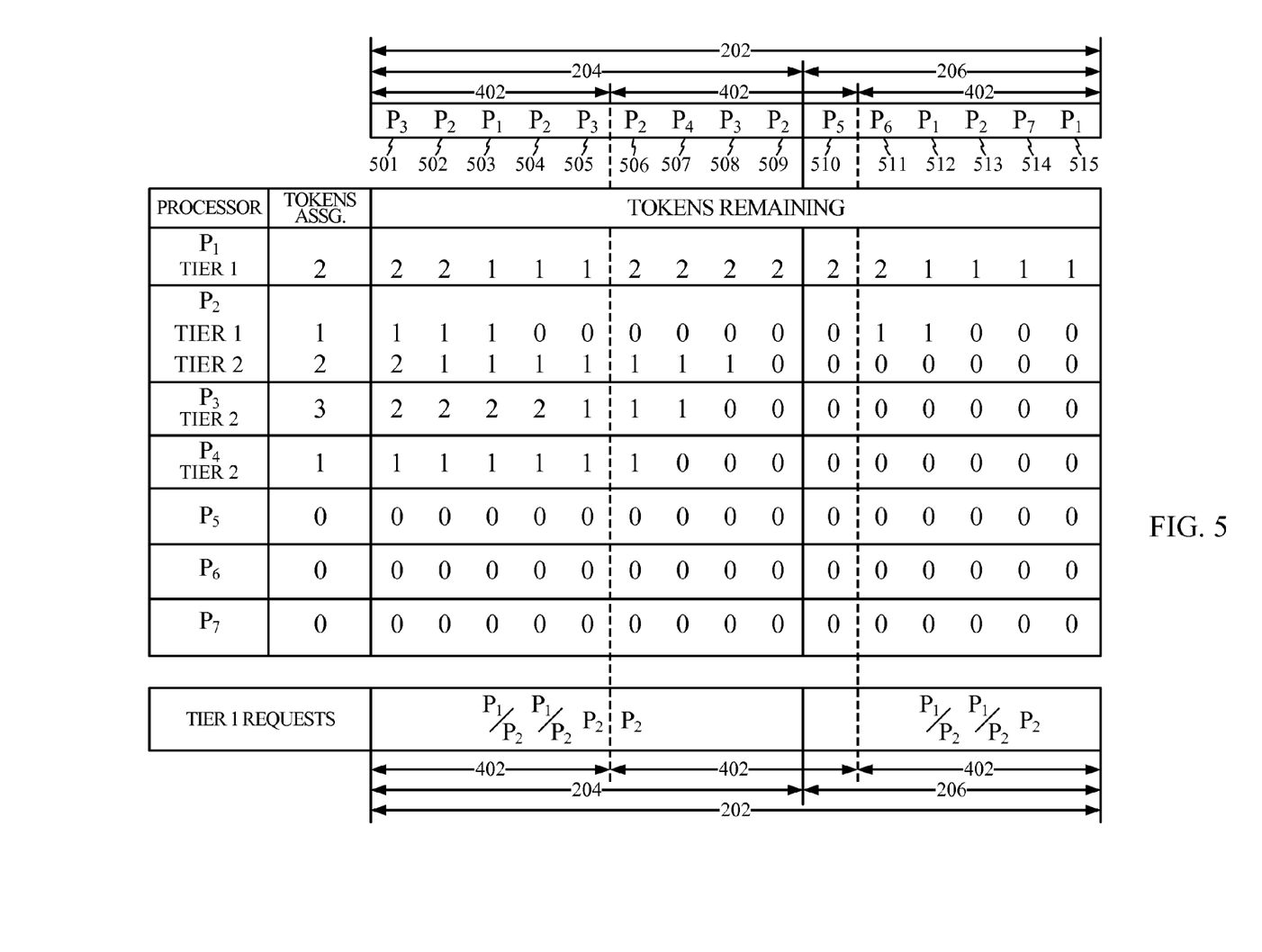
FIG. 5 is a conceptual diagram illustrating the operation of a bus access arbitration scheme capable of supporting both latency and high bandwidth requirements for various processors.

FIG. 5 is a conceptual diagram illustrating the operation of the first tier bus access arbitration scheme overlayed on the second bus access arbitration scheme of FIG. 3. In this example, there are two first tier processors ($P_1$, and $P_2$), three second tier processors ($P_2$, $P_3$ and $P_4$), and three third tier processors ($P_5$, $P_6$, and $P_7$). The second processor $P_2$ has both a latency requirement and a high bandwidth requirement, and therefore, has a first and second tier assignment. The first processor $P_1$ is a low latency processor with a first tier assignment, and the third and fourth processors ($P_3$ and $P_4$) are high bandwidth processors with a second tier assignment. The remaining processors ($P_5$, $P_6$, and $P_7$) are best efforts processors with no specific latency or bandwidth requirements.

The weights assigned by the bus arbiter to the first and second tier processors will be referred to as tokens. The first processor $P_1$ is assigned two first tier tokens, the second processor $P_2$ is assigned one first tier token and two second tier tokens, the third processor $P_3$ is assigned three second tier tokens, and the fourth processor $P_4$ is assigned one second tier token.

The bus arbiter initially sets the quality of service interval 402 to five time slots and the bus interval 202 to fifteen time slots. The first processor $P_1$ is shown making first tier requests for bus access during the third, fourth, twelfth and thirteenth time slots 503, 504, 512 and 513. The second processor $P_2$ is shown making first tier requests for bus access during the third through sixth time slots 503-506 and the twelfth through fourteenth time slots 512-514. Although not shown, all processors are continually making requests for bus access.

The bus access arbitration scheme enters the weighted time period 204 at the beginning of the bus interval 202. Contention for the bus during the first time slot 501 may be resolved by granting access to the second tier processor with the most tokens, which in this case is the third processor $P_3$ with three tokens. Upon granting bus access to the third processor $P_3$, the bus arbiter reduces the third processor's second tier tokens by one, leaving it with two second tier tokens.

Contention for the bus during the second time slot 502 may be resolved in a similar manner by granting bus access to the second tier processor with the most tokens. However, in this case, both the second and the third processors $P_2$ and $P_3$ have two tokens, which is more than any of the other second tier processors. The bus arbiter may employ a round robin arbitration scheme to arbitrate between the two processors. Since the third processor $P_3$ was granted access to the bus during the previous time slot 501, the bus arbiter grants bus access to the second processor $P_2$ during the current time slot 502. Upon granting bus access to the second processor $P_2$, the bus arbiter reduces the second processor's second tier tokens by one, leaving it with one second tier token.

During the third time slot 503, both the first and second processors $P_1$ and $P_2$ make a first tier request to access the bus. The bus arbiter, which is configured to give first tier requests priority, must arbitrate between the first and second processors $P_1$ and $P_2$ in this case. Since the first processor $P_1$ has more first tier tokens than the second processor $P_2$, the bus arbiter grants bus access to the first processor $P_1$. Upon granting bus access to the first processor $P_1$, the bus arbiter reduces the first processor's first tier tokens by one, leaving it with one first tier token.

Both the first and second processors $P_1$ and $P_2$ make repeated first tier requests to access the bus during the following time slot 504. However, this time the first and second processors $P_1$ and $P_2$ each have the same amount of first tier tokens, and therefore, the bus arbiter may use a round robin arbitration scheme to arbitrate between the two processors. Since the first processor $P_1$ was granted access to the bus in the preceding time slot 503, the bus arbiter may grant bus access to the second processor $P_2$. Upon granting access to the second processor $P_2$, the bus arbiter reduces the second processor's first tier tokens by one, leaving it with zero first tier tokens.

A repeated first tier request by the second processor $P_2$ during the fifth time slot 505 may be denied by the bus arbiter because the second processor $P_2$ has exhausted all of its first tier tokens. Instead, the bus arbiter grants bus access to the second tier processor having the most tokens, which in this case is the third processor $P_3$ with two second tier tokens. Upon granting bus access to the third processor $P_3$, the bus arbiter reduces the third processor's second tier tokens by one, leaving it with one second tier token.

A new quality of service interval 402 begins with the start of the sixth time slot 506. The bus arbiter resets each first tier processor with the appropriate number of tokens. Assuming no change in latency requirements, the bus arbiter increases the first processor's first tier tokens to two and the second processor's first tier tokens to one. The bus arbiter can now grant bus access to the second processor $P_2$ in response to a first tier request during the sixth time slot 503. Upon granted bus access to the second processor $P_2$, the bus arbiter reduces the second processor's first tier tokens by one, leaving it with zero first tier tokens. As a result, the second processor $P_2$ will not be granted any further access to the bus in response to a first tier request until the next quality of service interval 402.

During the seventh time slot 507, each of the second tier processors $P_2$ $P_3$ and $P_4$ has one token. The bus arbiter may use a round robin scheme to arbitrate bus access between the three processors. In this case, both the second and third processors $P_2$ and $P_3$ have accessed the bus during the current bus interval 202 in response to a second tier request. The fourth processor $P_4$, which has yet to access the bus in the current bus interval 202, may be granted access. Upon granting bus access to the fourth processor $P_4$, the bus arbiter reduces the fourth processor's second tier tokens to zero, leaving the second and third processors $P_2$ and $P_3$ with the most second tier tokens in the eighth time slot 508. The bus arbiter may continue to use a round robin arbitration scheme to grant memory access to the second and third processors $P_2$ and $P_3$ in the following two time slots 508 and 509 in any order, thereby exhausting all second tier tokens for the second tier processors to close out the weighted time period 204 of the bus interval 202.

The best efforts time period 206 follows the weighted time period 204. During the best efforts time period 206, the bus arbiter may grant access to the bus in a round robin fashion. In the example shown in FIG. 5, the fifth and sixth processors $P_5$ and $P_6$ may be granted access to the memory by the bus arbiter during the tenth and eleventh time slots 510 and 511, respectively. Alternatively, any other combination of processors may be granted bus access during the initial two time slots 510 and 511 of the best efforts time period 206.

The third quality of service interval 402 begins with the start of the eleventh time slot 511, and the first and second processors $P_1$ and $P_2$ are reset with their appropriate number of first tier tokens. Again, assuming that the latency requirements of these processors have not changed, the first processor's first tier tokens will remain at two, and the second processor's first tier tokens will be increased to one. As shown in FIG. 5, both of these processors make a first tier request to access the memory during the twelfth time slot 512. In response to these requests, the bus arbiter grants bus access to the first processor $P_1$, which has the most first tier tokens, during that time slot 512. Upon granting bus access to the first processor $P_1$, the bus arbiter reduces the first processor's first tier tokens by one, leaving it with one first tier token.

During the thirteenth time slot 513, both the first and second processors $P_1$ and $P_2$ make repeated first tier requests to access memory. However, this time the first and second processors $P_1$ and $P_2$ each have the same amount of first tier tokens, and therefore, the bus arbiter may use a round robin arbitration scheme to grant memory access to the second processor $P_2$ during that time slot 513. Upon granting bus access to the second processor $P_2$, the bus arbiter reduces the second processor's first tier tokens by one, leaving it with zero first tier tokens.

A repeated first tier request by the second processor $P_2$ during the fourteenth time slot 514 may be denied by the bus arbiter because the second processor $P_2$ has exhausted all of its first tier tokens. Instead, the bus arbiter grants bus access to the seventh processor $P_7$ in the fourteenth time slot 514 and the first processor $P_1$ in the fifteenth time slot 515 using a round robin arbitration scheme to support best efforts communications. Other combinations of bus access grants are also possible during these two time slots 514 and 515. At the end of the fifteenth time slot 515, a new bus interval and a new quality of service interval begins. The bus arbiter resets the first and second tier tokens for each processor, and the process described above is repeated.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processing system, comprising:
   a bus;
   a plurality of processors coupled to the bus; and
   a bus arbiter configured to assign a second tier weight to one or more of the processors, and sequentially grant bus access to the one or more processors having a second tier weight during an initial portion of a bus interval based on the assigned second tier weights, the bus arbiter being further configured to grant bus access to any one of the processors during the initial portion of the bus interval in response to a first tier request from said any one of the processors having a first tier weight, for each of the one or more of the processors granted access during the initial portion of the bus interval, the tier weight associated with a corresponding tier request is reduced for each time slot within the initial portion of the bus interval a processor has been granted access, the bus arbiter being further configured to reset the first tier weight of the one or more processors at the beginning of a quality of service interval wherein the length of the quality of service interval is not equal to the length of the bus interval.

2. The processing system of claim 1 wherein the bus arbiter is further configured to grant bus access to said any one of the processors in response to a request therefrom during the remaining portion of the bus interval following the initial portion of the bus interval.

3. The processing system of claim 2 wherein the bus arbiter is further configured to grant bus access to said any one of the processors during the remaining portion of the bus interval based on a round robin scheme.

4. The processing system of claim 1 wherein the bus arbiter is further configured to tune the duration of the bus interval.

5. The processing system of claim 1 wherein the initial portion of the bus interval ends when the second tier weight of each of the one or more processors is reduced to zero.

6. The processing system of claim 5 wherein the bus arbiter is further configured to set the second tier weight for each of the one or more processors at the beginning of each of the bus intervals.

7. The processing system of claim 1 wherein the second tier weight comprises the number of bus access grants required during the bus interval by the processor to which the second tier weight is assigned.

8. The processing system of claim 1 wherein the second tier weight comprises the number of data beats required during the bus interval by the processor to which the second tier weight is assigned.

9. The processing system of claim 1 wherein the duration of the quality of service interval is the same as the duration of the bus interval.

10. The processing system of claim 1 wherein the bus arbiter determines the duration of the quality of service interval.

11. The processing system of claim 1 wherein the bus arbiter is further configured to tune the duration of the quality of service interval.

12. A processing system, comprising:
a bus;
a plurality of processors coupled to the bus; and
a bus arbiter configured to assign a first tier weight to each of the processors in a first tier, and assign a second tier weight to each of the processors in a second tier, the bus arbiter being further configured to arbitrate between one or more of the processors requesting access to the bus by granting bus access to the requesting processor with the highest weight in the highest tier during an initial portion of a bus interval, the first tier being higher than the second tier, for each of the one or more of the processors granted access during the initial portion of the bus interval, the tier weight associated with a corresponding tier request is reduced for each time slot within the initial portion of the bus interval a processor has been granted access, the bus arbiter being further configured to reset the first tier weight of the one or more processors at the beginning of a quality of service interval wherein the length of the quality of service interval is not equal to the length of the bus interval.

13. The processing system of claim 12 wherein the bus arbiter is further configured to tune the duration of the quality of service interval and the bus interval.

14. The processing system of claim 12 wherein the second tier weight comprises the number of bus access grants required during the bus interval by the processor to which the second tier weight is assigned.

15. The processing system of claim 12 wherein the second tier weight comprises the number of data beats required during the bus interval by the processor to which the second tier weight is assigned.

16. The processing system of claim 12 wherein the second tier weight assigned to each of the processors in the second tier relates to the bandwidth of the processor to which the second tier weight is assigned.

17. The processing system of claim 12 wherein the bus arbiter is further configured to arbitrate between the one or more of the processors requesting access to the bus by granting bus access to one of the one or more requesting processors in a round robin fashion if none of the requesting processors have a first or second tier weight.

18. The processing system of claim 12 wherein one or more of the processors is in both the first and second tiers.

19. A method of arbitrating between a plurality of processors requesting access to a bus, comprising:
assigning a second tier weight to each of one or more of the processors;
sequentially granting bus access to the one or more processors during an initial portion of a bus interval based on the assigned second tier weights;
granting bus access to any one of the processors during the initial portion of the bus interval in response to a request from said any one of the processors having a first tier weight;
reducing the first tier weight for each of the one or more of the processors granted access during the initial portion of the bus interval; and
resetting the first tier weight of the one or more processors at the beginning of the quality of service interval wherein the length of the quality of service interval is not equal to the length of the bus interval.

20. The method of claim 19 further comprising granting bus access to said any one of the processors in response to a request therefrom during the remaining portion of the bus interval following the initial portion of the bus interval.

21. The method of claim 20 wherein the granting of bus access to said any one of the processors during the remaining portion of the bus interval is based on a round robin scheme.

22. The method of claim 19 further comprising tuning the duration of the bus interval.

23. The method of claim 19 wherein bus access is granted to the processor of the one or more processors with the highest second tier weight, the method further comprising reducing the second tier weight of such processor after bus access is granted.

24. The method of claim 23 wherein the initial portion of the bus interval ends when the second tier weight of each of the one or more processors is reduced to zero.

25. The method of claim 19 wherein the second tier weight comprises the number of bus access grants required during the bus interval by the processor to which the second tier weight is assigned.

26. The method of claim 19 wherein the second tier weight comprises the number of data beats required during the bus interval by the processor to which the second tier weight is assigned.

27. The method of claim 19 further comprising tuning the duration of the quality of service interval.

28. A method of arbitrating between a plurality of processors requesting access to a bus, comprising:
assigning a first tier weight to each of the processors in a first tier;
assigning a second tier weight to each of the processors in a second tier;
arbitrating between one or more of the processors requesting access to the bus by granting bus access to the requesting processor with the highest weight in the highest tier, the first tier being higher than the second tier;
reducing the first tier weight for each of the one or more of the processors granted access during the initial portion of the bus interval; and
resetting the first tier weight of the one or more processors at the beginning of the quality of service interval wherein the length of the quality of service interval is not equal to the length of the bus interval.

29. The method of claim 28 further comprising tuning the duration of the quality of service interval and the bus interval.

30. The method of claim 28 wherein the second tier weight comprises the number of bus access grants required during the bus interval by the processor to which the second tier weight is assigned.

31. The method of claim 28 wherein the second tier weight comprises the number of data beats required during the bus interval by the processor to which the second tier weight is assigned.

32. The method of claim 28 wherein the second tier weight assigned to each of the processors in the second tier relates to the bandwidth of the processor to which the second tier weight is assigned.

33. The method of claim 28 the arbitration between the one or more of the processors requesting access to the bus is performed in a round robin fashion if none of the requesting processors have a first or second tier weight.

34. The method of claim 28 wherein the assignment of the first tier weight to each of the processors in the first tier and the assignment of the second tier weight to each of the processors in the second tier comprising assigning a first and second weight to the same one of the processors.

* * * * *